(12) United States Patent
Kennedy et al.

(10) Patent No.: US 10,706,519 B2
(45) Date of Patent: Jul. 7, 2020

(54) VEHICLE DETECTION SYSTEM AND METHOD

(71) Applicant: Deere & Company, Moline, IL (US)

(72) Inventors: Thomas L. Kennedy, Dubuque, IA (US); David J. Meyers, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 56 days.

(21) Appl. No.: 16/148,427

(22) Filed: Oct. 1, 2018

(65) Prior Publication Data

US 2020/0104989 A1  Apr. 2, 2020

(51) Int. Cl.

| | |
|---|---|
| *G01M 3/38* | (2006.01) |
| *G01M 3/20* | (2006.01) |
| *G06T 7/00* | (2017.01) |
| *H04N 5/225* | (2006.01) |
| *G06T 7/90* | (2017.01) |
| *B60Q 1/24* | (2006.01) |
| *B60Q 9/00* | (2006.01) |
| *B60R 1/00* | (2006.01) |
| *G07C 5/08* | (2006.01) |
| *E02F 9/26* | (2006.01) |
| *G01M 3/02* | (2006.01) |

(52) U.S. Cl.
CPC .............. *G06T 7/0002* (2013.01); *B60Q 1/24* (2013.01); *B60Q 9/00* (2013.01); *B60R 1/002* (2013.01); *G01M 3/20* (2013.01); *G06T 7/90* (2017.01); *G07C 5/0808* (2013.01); *H04N 5/2256* (2013.01); *B60R 2300/802* (2013.01); *E02F 9/267* (2013.01); *G01M 3/025* (2013.01); *G06T 2207/10048* (2013.01); *G06T 2207/10064* (2013.01); *G06T 2207/30248* (2013.01)

(58) Field of Classification Search
CPC .......... G01M 3/025; G01M 3/38; G01M 3/20
See application file for complete search history.

(56) References Cited

U.S. PATENT DOCUMENTS

| | | | |
|---|---|---|---|
| 4,772,789 A | 9/1988 | Maram et al. | |
| 7,984,574 B2 | 7/2011 | Pfohl et al. | |
| 8,438,908 B2 | 5/2013 | Howieson | |
| 9,042,967 B2 | 5/2015 | Dacosta et al. | |
| 2016/0123885 A1* | 5/2016 | Klipstein | G01M 3/20 250/459.1 |
| 2019/0094100 A1* | 3/2019 | Saha | F02C 7/222 |
| 2019/0170605 A1* | 6/2019 | Seemueller | G01M 3/04 |
| 2019/0376869 A1* | 12/2019 | Dudar | G01M 3/007 |

* cited by examiner

*Primary Examiner* — Herbert K Roberts

(57) ABSTRACT

A vehicle detection system and method is disclosed. The vehicle detection system can comprise an imaging device arranged on a vehicle and at least one light source that is configured to illuminate a target area arranged beneath the vehicle to excite at least one reactive agent contained within a fluid sample disposed at the target area. A detection device is coupled to the imaging device and configured to detect an intensity of light reflected from the target area and generate an output signal indicative of a color characteristic of the at least one reactive agent. An electronic data processor is communicatively coupled to the imaging device, light source, and detection device, and is configured to associate the detected color characteristic of the at least one reactive agent with a fluid system of the vehicle, and display a location of the fluid system on an operator interface.

15 Claims, 3 Drawing Sheets

VEHICLE DETECTION SYSTEM AND METHOD

FIELD OF THE DISCLOSURE

The present disclosure relates generally to detection systems, and, more particularly, to a vehicle leak detection system and method.

BACKGROUND OF THE DISCLOSURE

Fluid leaks are a common problem associated with vehicle use. For example, fluid leaks can result from normal wear and tear of the vehicle and, in some cases, can lead to system failures. To assist operators in detecting leaks or identifying potential system failures, there is a need in the art for an improved leak detection system that is cost effective and provides increased detection accuracy.

SUMMARY OF THE DISCLOSURE

According to an aspect of the present disclosure, a vehicle detection system and method is disclosed. In some embodiments, the vehicle detection system can comprise an imaging device arranged on a vehicle and at least one light source that is configured to illuminate a target area arranged beneath the vehicle to excite at least one reactive agent contained within a fluid sample disposed at the target area. A detection device is coupled to the imaging device and configured to detect an intensity of light reflected from the target area and generate an output signal indicative of a color characteristic of the at least one reactive agent. An electronic data processor is communicatively coupled to the imaging device, light source, and detection device, and is configured to associate the detected color characteristic of the at least one reactive agent with a fluid system of the vehicle, and display a location of the fluid system on an operator interface.

Other features and aspects will become apparent by consideration of the detailed description and accompanying drawings.

BRIEF DESCRIPTION OF THE DRAWINGS

The detailed description of the drawings refers to the accompanying figures in which.

Like reference numerals are used to indicate like elements throughout the several figures.

DETAILED DESCRIPTION OF THE DRAWINGS

Figure 1:
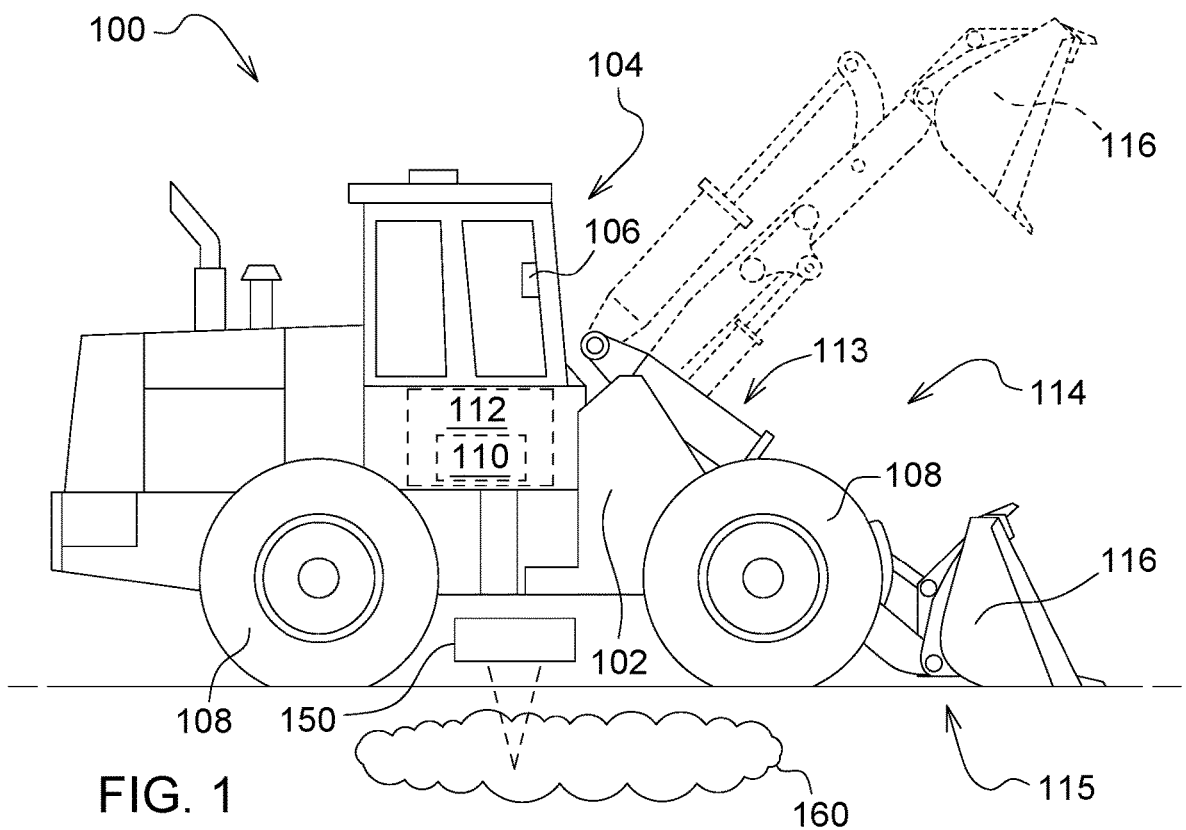
FIG. 1 is an illustration of a vehicle detection system in use with a vehicle according to an embodiment.

Referring to FIG. 1, a vehicle 100 having a vehicle detection system 150 that is configured as an automatic leak detection system for on-road and off-road vehicle applications is shown according to an embodiment. Although the vehicle 100 is shown as including a construction vehicle (e.g., a loader) in FIG. 1, it should be noted that, in other embodiments, the vehicle 100 can vary according to application and specification requirements. For example, in other embodiments, the vehicle 100 can include forestry, agricultural, turf, or on-road vehicles, with embodiments discussed herein being merely for exemplary purposes to aid in an understanding of the present disclosure.

The vehicle 100 can comprise a frame 102 and an operator cab 104 supported by wheels 108. A boom assembly 114 can be coupled to the frame 102 and can extend in length between a proximal end 113 and a distal end 115. A bucket structure 116 can be coupled to the boom assembly 114 at its distal end 115 and can comprise a conventional loader bucket as shown. It should be noted, however, that FIG. 1 is but one embodiment and, in other embodiments, the bucket structure 116 may include a ripper, hammer, or fork, for example.

As illustrated in FIG. 1, the vehicle detection system 150 can be mounted to a bottom panel of the vehicle 100 and oriented such that light emissions projected from the vehicle detection system 150 are directed toward a target area 160. The target area 160 can include a predefined ground surface area that is selected or identified based on a predicted leak location. For example, a location of the target area 160 can be determined based on a location of a fluid system (e.g., an engine coolant system) arranged in the vehicle 100 that may be particularly susceptible to fluid leaks.

In some embodiments, the vehicle detection system 150 can comprise at least one imaging device 152, a light emission source 154, and a detection device 156 each communicatively coupled to an electronic data processor 110 via a communication bus 155 as will be discussed in further detail with reference to FIG. 2. The imaging device 152 can be integrally or separately arranged with the light emission source 154 to capture images and illuminate the target area 160 positioned underneath or proximate the fluid system of the vehicle 100. For example, illumination of the target area 160 by the light emission source 154 can excite a fluorescent emission from the at least one reactive agent (e.g., a fluorescent dye) contained within the fluid (e.g., engine coolant, hydraulic oil, transmission oil, etc.) that is detectable by the detection device 156 (e.g., an optical detector).

The electronic data processor 110 can be arranged locally as part of a vehicle electronics unit 200 of the vehicle 100 or remotely at a remote processing center (not shown). In various embodiments, the electronic data processor 110 can comprise a microprocessor, a microcontroller, a central processing unit, a programmable logic array, a programmable logic controller, other suitable programmable circuitry that is adapted to perform data processing and/or system control operations.

As will be appreciated by those skilled in the art, FIG. 1 is provided for illustrative and exemplary purposes only and is in no way intended to limit the present disclosure or its applications. In other embodiments, the arrangement and/or structural configuration of vehicle detection system 150 can vary. For example, in some embodiments, the vehicle detection system 150 can comprise two or more imaging devices (e.g., imaging device 152). Additionally, in other embodiments, the orientation and the location of the vehicle detection system also vary. For example, in other embodiments, the vehicle detection system 150 can be mounted in the frame 102 of the vehicle 100, an engine compartment, or other location prone to fluid leakage as will be discussed herein.

Figure 2:
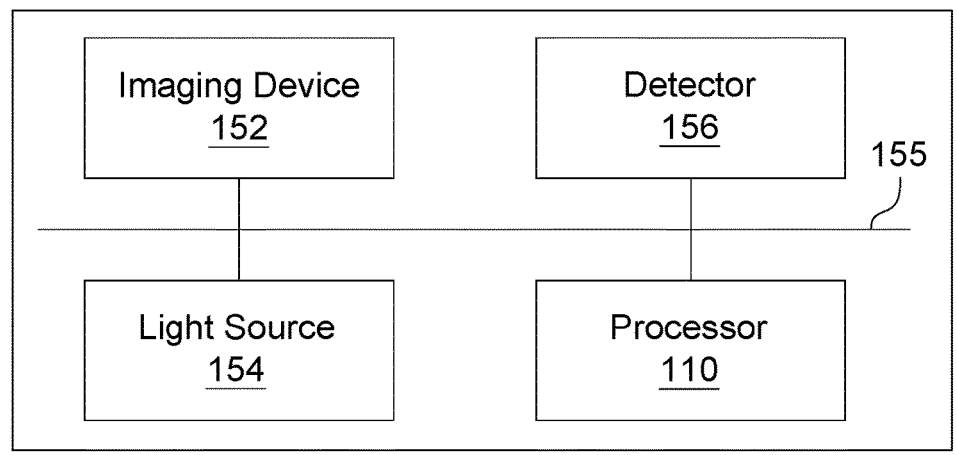
FIG. 2 is a block diagram of a vehicle detection system according to an embodiment.
Figure 3:
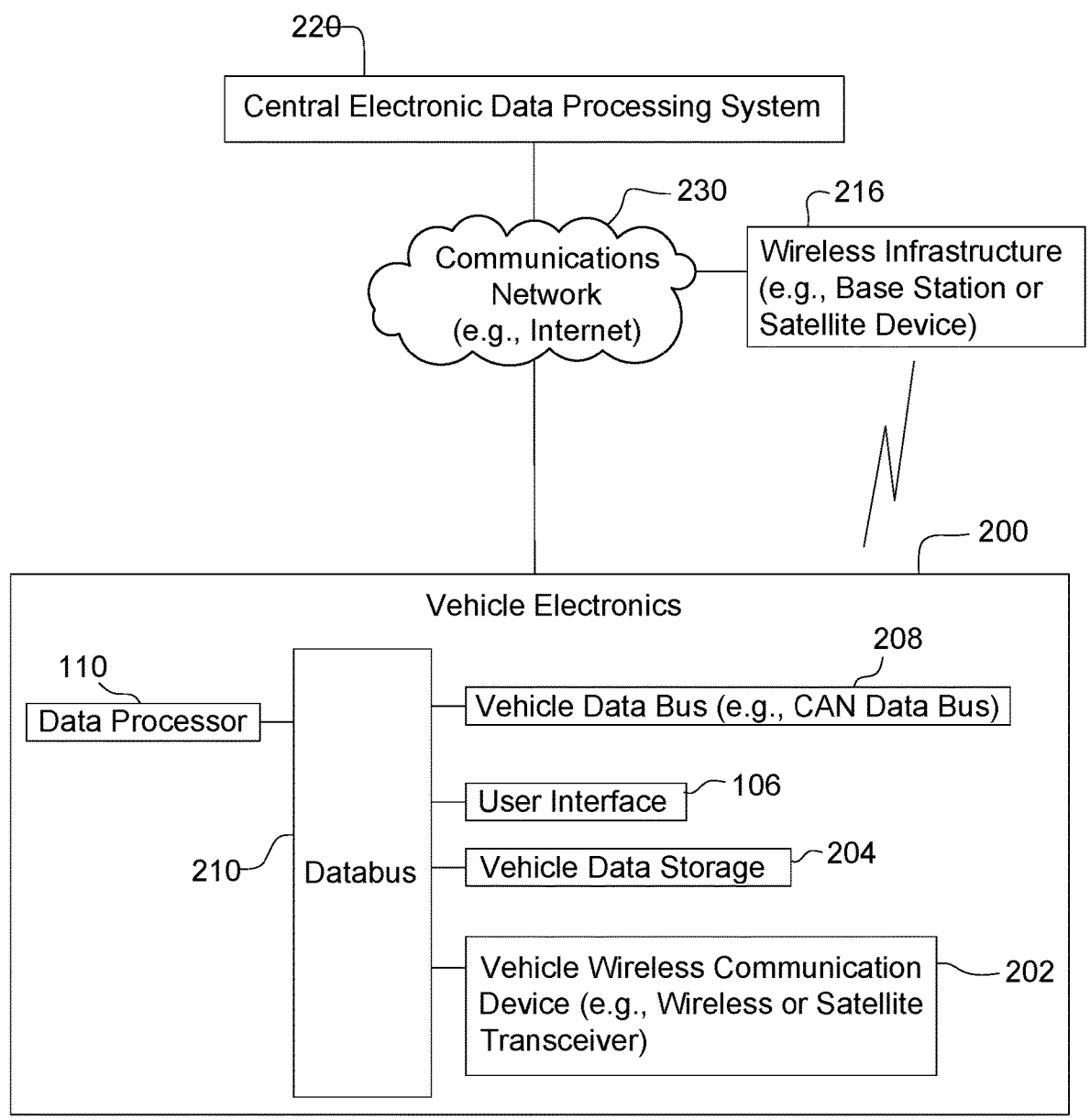
FIG. 3 is a block diagram of a vehicle electronics unit according to an embodiment.

Referring now to FIGS. 2 and 3, a block diagram of the vehicle detection system 150 and a vehicle electronics unit 200 are shown according to an embodiment. As discussed with reference to FIG. 1, the vehicle detection system 150 can comprise the imaging device 152, which, in some embodiments, can comprise a camera, thermal imaging device, infrared imaging device, scanner, or other suitable imaging that is capable of capturing imaging data of the target area 160.

As previously discussed, the light emission source 154 can be integrally arranged with or arranged proximate the imaging device 152, and can comprise a variety of light emission devices that emit light beams of various wavelengths. For example, in embodiments, the light emission source 154 can include, without limitation, an ultraviolet source, an infrared source, a near-infrared source, a laser source, a diode source, an optical source, a gas laser source, or other suitable devices. The light emission source 154 can be configured to emit a light beam to illuminate the target area 160 such that, upon illumination, the reactive agent fluoresces at a predetermined wavelength corresponding to a fluid color (i.e., dye color) associated with one or more fluid systems of the vehicle 100.

In some embodiments, the detection device 156 can be mounted directly adjacent to the light emission source 154. The detection device 156 can be configured to detect an intensity of light reflected from the reactive agent disposed in a fluid sample at the target area 160 and generate an output signal indicative of the fluid color of the at least one reactive agent. In other embodiments, the detection device 156 can be collectively arranged with the light emission source 154 and/or the imaging device 152 as a single component.

Referring now to FIG. 3, in some embodiments, the electronic data processor 110 can be arranged in a vehicle electronics unit 200 and can be configured to associate the detected color characteristic of the at least one reactive agent with a fluid system of the vehicle. For example, by associating the color characteristic with the fluid system, it can be determined if leakage from one or more of the fluid systems has occurred. The vehicle electronics unit 200 can comprise the electronic data processor 110 (i.e., vehicle data processor 110), a vehicle data storage device 204, a vehicle wireless communications device 216, the operator interface 106, and a vehicle data bus 210 each communicatively interfaced with a main data bus 210. As depicted, the various devices (i.e., vehicle data storage device 204, vehicle wireless communications device 216, user interface 106, and vehicle data bus 210) may communicate information, e.g., sensor signals, over the main data bus 210 to the vehicle data processor 110.

In other embodiments, the vehicle data processor 110 manages the transfer of data to and from a remote processing system 220 via a network 230 and wireless infrastructure 216. For example, the vehicle data processor 110 collects and processes data (e.g., data representing one or more conditions or characteristics) from the main data bus 210 for transmission either in a forward or rearward direction (i.e., to or from processing system 220). In various embodiments, the vehicle data processor 110 may comprise a microprocessor, a microcontroller, a central processing unit, a programmable logic array, an application specific integrated circuit, a logic circuit, an arithmetic logic unit, or another data processing system for processing, storing, retrieving, or manipulating electronic data.

The vehicle data storage device 204 stores information and data for access by the vehicle data processor 110 or the vehicle data bus 210. The vehicle data storage device 204 may comprise electronic memory, nonvolatile random-access memory, an optical storage device, a magnetic storage device, or another device for storing and accessing electronic data on any recordable, rewritable, or readable electronic, optical, or magnetic storage medium.

For example, the vehicle data storage device 204 may include one or more software modules that records and stores data collected by detection device 156 or other network devices coupled to or capable of communicating with the vehicle data bus 210, or another sensor or measurement device for sending or measuring parameters, conditions or status of the vehicle electronics unit 200, vehicle systems, or vehicle components. In other embodiments, the processed data may be stored in a memory, which may include, but is not limited to, random access memory (RAM), read only memory (ROM), optical data storage, dynamic data storage, and/or combinations thereof.

Figure 4:
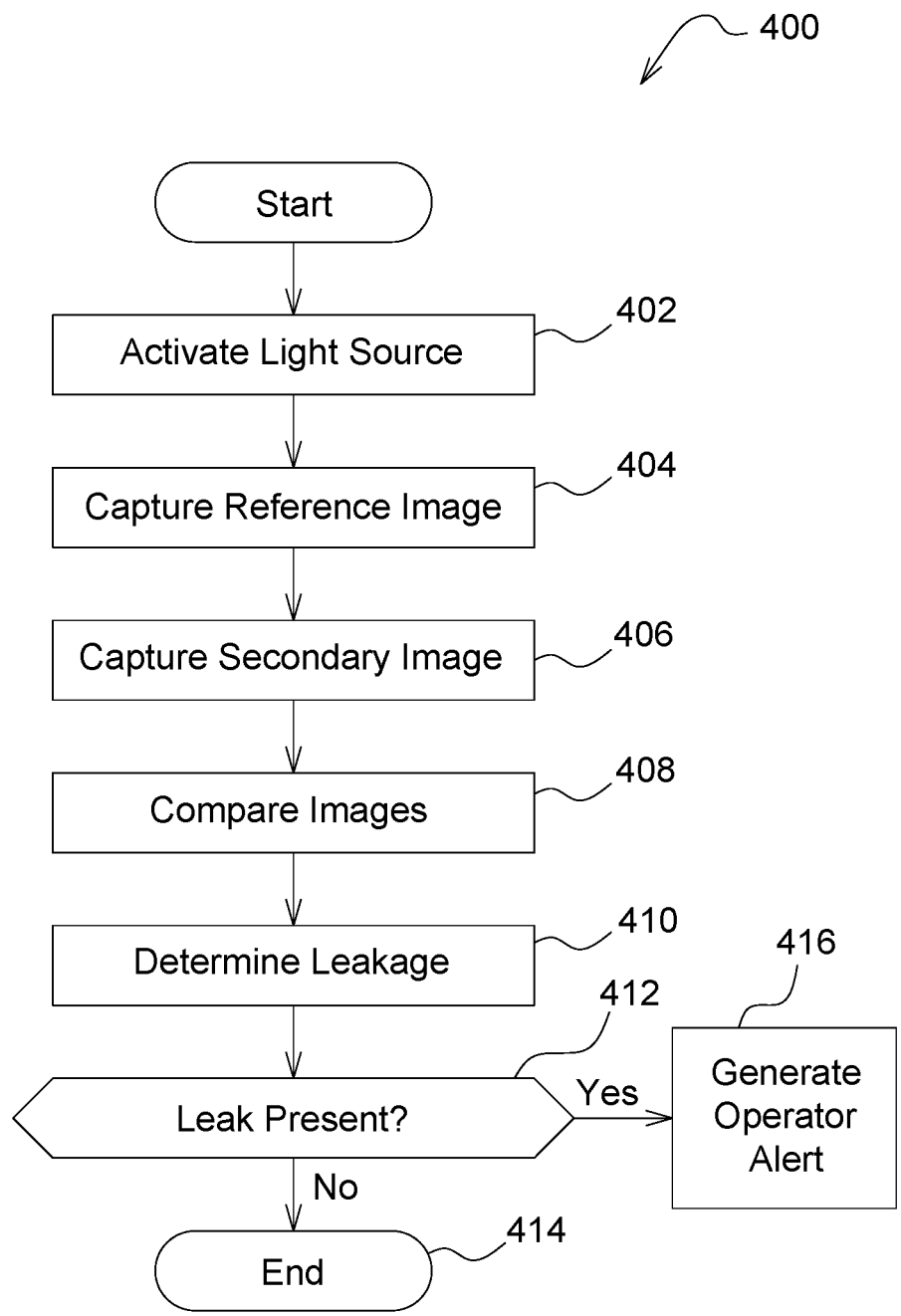
FIG. 4 is a flow diagram of a method for detecting a fluid leak with the vehicle detection system.

In operation, referring now to FIG. 4, a flow diagram of a method 400 for detecting one or more fluid leaks is shown. At 402, upon receipt of an input via the operator interface 106, the imaging device 152 and the light emission source 154 are activated. For example, upon activation, the light emission source 154 illuminates the target area 160 simultaneously as the imaging device 152 captures reference imaging data of the target area 160 at 404 to determine if any fluids are on the ground from other vehicles or spillage. Next at 406, upon key-on or start-up of the vehicle 100, the imaging device 152 captures a second image of the target area 160. Once the two images are captured, the electronic data processor 110 compares the two images or a set of images at 408 to determine if any fluids have leaked or are present within the target area 160. For example, at 410, this can be done by determining between shutdown and startup if there has been an increase in an amount of fluid within the target area 160 by measuring a light intensity of a reactive agent contained within the fluid that is associated with a fluid system. At 412, a decision is made based upon this analysis and if no leaks are present, the operation would end at 414. Otherwise, if a leak is present, the electronic data processor 110 would then indicate to the operator if a leak was detected and what system it came from, and if there were multiple cameras, it could indicate the location of the machine from which it originated at 416. For example, on a 4WD (four-wheel drive) loader, the system could state to the operator that there is a hydraulic leak detected under the loader frame or engine frame, specifically.

Without in any way limiting the scope, interpretation, or application of the claims appearing below, a technical effect of one or more of the example embodiments disclosed herein is a vehicle detection system. The vehicle detection system is particularly advantageous in that it allows for real-time monitoring of fluid leaks.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A vehicle detection system, the vehicle detection system comprising:
   an imaging device arranged on a vehicle;
   at least one light source configured to illuminate a target area arranged beneath the vehicle to excite at least one reactive agent contained within a fluid sample disposed at the target area;
   a detection device coupled to the imaging device, wherein the detection device is configured to detect an intensity of light reflected from the target area and generate an output signal indicative of a color characteristic of the at least one reactive agent; and an electronic data processor, wherein the electronic data processor is configured to associate the detected color characteristic of the at least one reactive agent with a fluid system of the vehicle, and wherein the electronic data processor is configured to display a location of the fluid system on an operator interface.

2. The vehicle detection system of claim 1, wherein the imaging device comprises a camera, thermal imager, infrared imaging device, video recorder, or combinations thereof.

3. The vehicle detection system of claim 1, further comprising generating an operator alert indicative of a fluid system failure.

4. The vehicle detection system of claim 1, wherein the fluid sample comprises at least one of an engine coolant, a brake fluid, a power steering fluid, or a transmission oil.

5. The vehicle detection system of claim 1, wherein the imaging device and the detection device are arranged substantially parallel to a surface of the target area.

6. The vehicle detection system of claim 1, wherein the light source emits a light beam at an angle approximately 45 to 90 degrees to a surface of the target area.

7. The vehicle detection system of claim 1, wherein the imaging device comprises two or more light sources.

8. The vehicle detection system of claim 1, wherein the detection device is an optical detector.

9. The vehicle detection system of claim 1, wherein the at least one reactive agent comprises a fluorescent dye.

10. The vehicle detection system of claim 9, wherein the fluorescent dye fluoresces at a predetermined wavelength when exposed to the light beam emitted by the light source.

11. A vehicle, the vehicle comprising:
a vehicle frame;
a wheel assembly operably coupled to the vehicle frame;
an imaging device arranged on a vehicle;
at least one light source configured to illuminate a target area arranged beneath the vehicle to excite at least one reactive agent contained within a fluid sample disposed at the target area;
a detection device coupled to the imaging device, wherein the detection device is configured to detect an intensity of light reflected from the target area and generate an output signal indicative of a color characteristic of the at least one reactive agent; and
an electronic data processor, wherein the electronic data processor is configured to associate the detected color characteristic of the at least one reactive agent with a fluid system of the vehicle, and wherein the electronic data processor is configured to display a location of the fluid system on an operator interface.

12. The vehicle of claim 11, wherein the imaging device comprises a camera, thermal imager, infrared imaging device, video recorder, or combinations thereof.

13. The vehicle of claim 11, wherein the imaging device and the detection device are arranged substantially parallel to a surface of the target area.

14. The vehicle of claim 11, wherein the light source emits a light beam at an angle approximately 45 to 90 degrees to a surface of the target area.

15. The vehicle of claim 11, wherein the at least one reactive agent comprises a fluorescent dye that fluoresces at a predetermined wavelength when exposed to the light beam emitted by the light source.

* * * * *